US008166176B2

(12) United States Patent
Kumar et al.

(10) Patent No.: US 8,166,176 B2
(45) Date of Patent: Apr. 24, 2012

(54) CONTEXT-AWARE MIGRATION OF COMMUNICATION SESSION

(75) Inventors: Vijay Pochampalli Kumar, Holmdel, NJ (US); Chitra A. Phadke, Basking Ridge, NJ (US); Viswanath Poosala, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 676 days.

(21) Appl. No.: 11/444,010

(22) Filed: May 31, 2006

(65) Prior Publication Data

US 2007/0282990 A1   Dec. 6, 2007

(51) Int. Cl.
 *G06F 15/16* (2006.01)
(52) U.S. Cl. ........................................ 709/227; 370/350
(58) Field of Classification Search .......... 709/223–226, 709/217–219
See application file for complete search history.

(56) References Cited

U.S. PATENT DOCUMENTS

| | | | |
|---|---|---|---|
| 6,195,564 B1 * | 2/2001 | Rydbeck et al. | 455/557 |
| 7,099,946 B2 * | 8/2006 | Lennon et al. | 709/227 |
| 2001/0025280 A1 * | 9/2001 | Mandato et al. | 707/3 |
| 2002/0186676 A1 * | 12/2002 | Milley et al. | 370/341 |
| 2003/0084165 A1 | 5/2003 | Kjellberg et al. | |
| 2004/0068567 A1 * | 4/2004 | Moran et al. | 709/227 |
| 2004/0085949 A1 | 5/2004 | Partanen et al. | |
| 2004/0187021 A1 | 9/2004 | Rasanen | |
| 2004/0203664 A1 | 10/2004 | Lei et al. | |
| 2005/0033843 A1 * | 2/2005 | Shahi et al. | 709/226 |
| 2006/0080407 A1 * | 4/2006 | Rengaraju | 709/219 |
| 2006/0294244 A1 * | 12/2006 | Naqvi et al. | 709/227 |

FOREIGN PATENT DOCUMENTS

EP  1439725  7/2004
WO  PCT/US2007/012423  12/2007

OTHER PUBLICATIONS

R. Shacham et al., "The Virtual Device: Expanding Wireless Communication Services through Service Discovery and Session Mobility," IEEE International Conference on Wireless and Mobile Computing, Networking and Communications, Aug. 2005, pp. 73-81.
H.J. Wang et al., "A Signaling System Using Lightweight Call Sessions," IEEE INFOCOM, Mar. 2000, pp. 697-706, vol. 2.
"3rd Generation Partnership Project; Technical Specification Group Services and System Aspects; IP Multimedia Subsystem (IMS); Stage 2 (Release 6)," Mar. 2006, pp. 1-181.

* cited by examiner

*Primary Examiner* — Ian N Moore
*Assistant Examiner* — Thai Nguyen
(74) *Attorney, Agent, or Firm* — Ryan, Mason & Lewis, LLP

(57) ABSTRACT

Techniques and systems are disclosed for context-aware migration of a communication network session. For example, a system for migrating a communication session established between a first entity and a second entity in accordance with an application module includes the following elements. A context monitor module supports the application module and is operative to obtain context information associated with at least one of the first entity and the second entity. A migration server module supports the application module and is operative to effectuate a transfer of the communication session from one communication device associated with the first entity to another communication device associated with the first entity. The context monitor module and the migration server module operate in cooperation with the application module to transfer the communication session.

21 Claims, 5 Drawing Sheets

100

DEVICE A MIGRATES TO DEVICE C

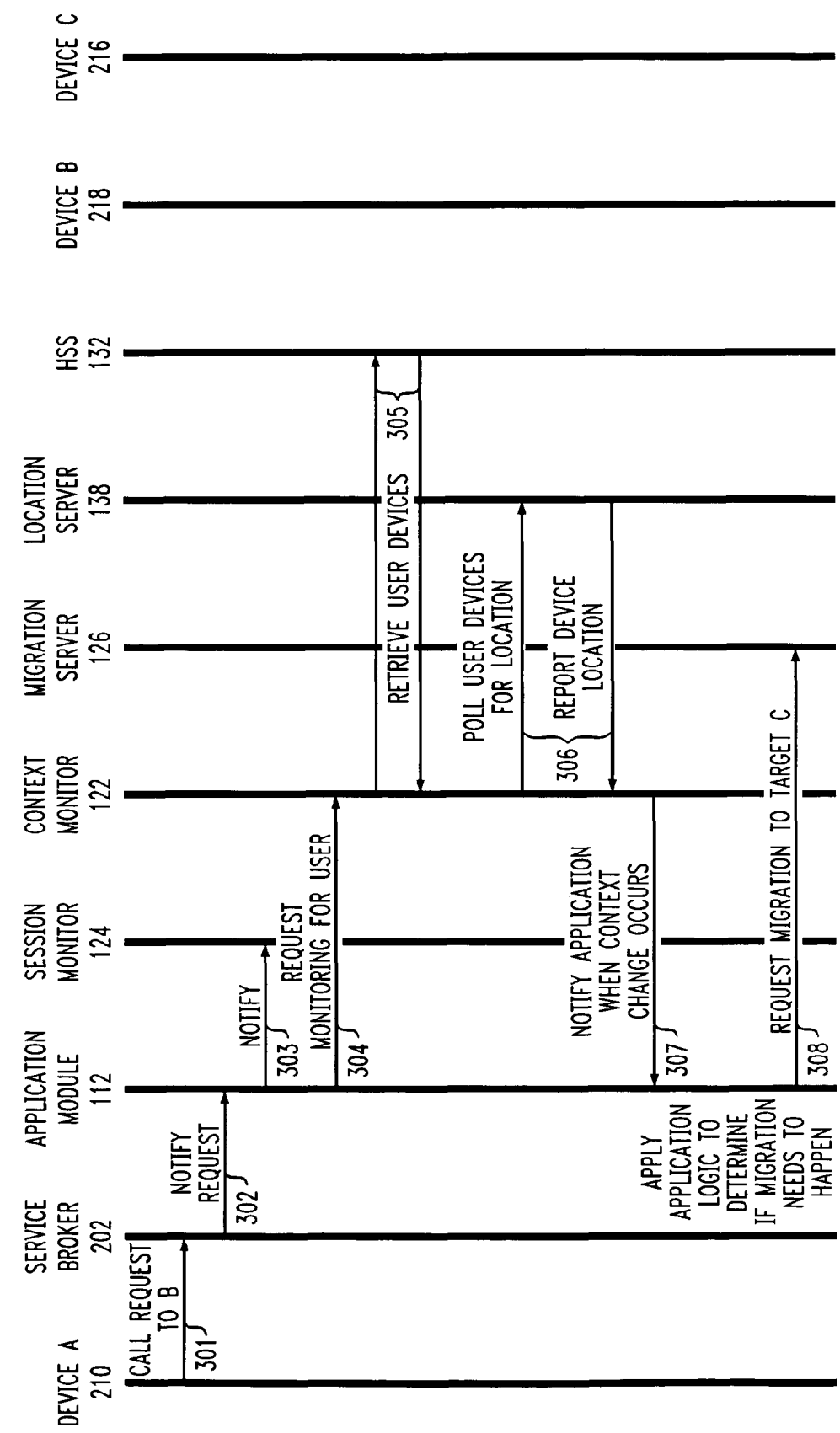

CONTEXT-AWARE MIGRATION OF COMMUNICATION SESSION

FIELD OF THE INVENTION

The present invention relates generally to the field of data communication networks and, more particularly, to techniques for context-aware migration of a communication session such as an Internet Protocol (IP) multimedia subsystem (IMS) session.

BACKGROUND OF THE INVENTION

Internet Protocol (IP) multimedia subsystem (IMS) is a next-generation communication network for carriers from the $3^{rd}$ Generation Partnership Project (3GPP) that uses the IP protocol as its foundation. As is known, 3GPP is a cooperation of international standards bodies for the promotion of cellular systems that support high-speed data, known as "3rd-Generation" (3G) systems. The IMS supports data, video, Session Initiation Protocol (SIP) based voice over IP (VoIP) and non-SIP packetized voice, such as the International Telecommunications Union (ITU) H.323 standard and the Media Gateway Control Protocol (MGCP). IMS was also designed to integrate with the Public Switched Telephone Network (PSTN) and provide traditional telephony services.

The IMS was conceived to offer support for a wide variety of types of communication sessions whether over wireless or wireline, including instant messaging (IM), push-to-talk, videoconferencing and video-on-demand (VOD). The IMS thus blends services for converged wireline and wireless networks. The IMS architecture separates the service layer from the session and access layers. The defining of clear application programming interfaces (APIs) between the different layers makes service creation easier for third parties and easily deployable by service providers.

Due at least to the fact that an IMS session is capable of supporting a wide variety of communication protocols and platforms, a need exists for providing flexibility to users in terms of migration between communication devices employed during an IMS session.

SUMMARY OF THE INVENTION

Principles of the invention provide techniques and systems for context-aware migration of a communication network session.

For example, in one aspect of the invention, apparatus for migrating a communication session established between a first entity and a second entity in accordance with an application module includes the following elements. A context monitor module supports the application module and is operative to obtain context information associated with at least one of the first entity and the second entity. A migration server module supports the application module and is operative to effectuate a transfer of the communication session from one communication device associated with the first entity to another communication device associated with the first entity. The context monitor module and the migration server module operate in cooperation with the application module to transfer the communication session.

The application module may receive at least a portion of the context information obtained by the context monitor module. The application module may determine whether or not to transfer the communication session from the one communication device of the first entity to the other communication device of the first entity based at least in part on the received context information. The application module may cause the migration server module to effectuate the transfer when a transfer determination is made such that the communication session continues between the first entity and the second entity after the transfer.

The apparatus may further include a session monitor module supporting the application module and operative to obtain information associated with the communication session, wherein the application module receives at least a portion of the session information for use in making the transfer determination.

Further, the apparatus may include one or more support modules supporting at least one of the context monitor module and the application module and operative to provide information thereto. The one or more support modules may include one or more of a module for storing information pertaining to at least one of a profile and a preference of the first entity; a module for storing information pertaining to a schedule associated with the first entity; a module for storing information pertaining to a policy associated with the first entity; a module for storing information pertaining to a location of one or more communication devices associated with the first entity; a module for storing information pertaining to a status of one or more communication devices associated with the first entity; and a module for transcoding media to be presented on the other communication device when the session is transferred from the one communication device to the other communication device.

Still further, the apparatus may include a client module resident on the one communication device associated with the first entity and operative to facilitate a transfer of the communication session from the one communication device to the other communication device.

Context information may include one or more of geographic location information associated with at least the first entity; information pertaining to a proximity of at least the first entity to other communication devices at which at least the first entity can communicate; information pertaining to a quality associated with a communication network in which the communication session is established; information pertaining to the communication session; information pertaining to an activity of at least the first entity; and information pertaining to one or more ambient conditions. It is to be understood that context information may include other types of information.

In one embodiment, the communication session is an Internet Protocol Multimedia Subsystem (IMS) session.

Advantageously, in accordance with the above-described apparatus, the application module need not be burdened with gathering context information since the separate context monitor module will independently perform this task. Further, the application module need not be burdened with effectuating the actual migration since the separate migration server module will independently perform this task. Thus, programming of the application is simplified and application processing is more efficient.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
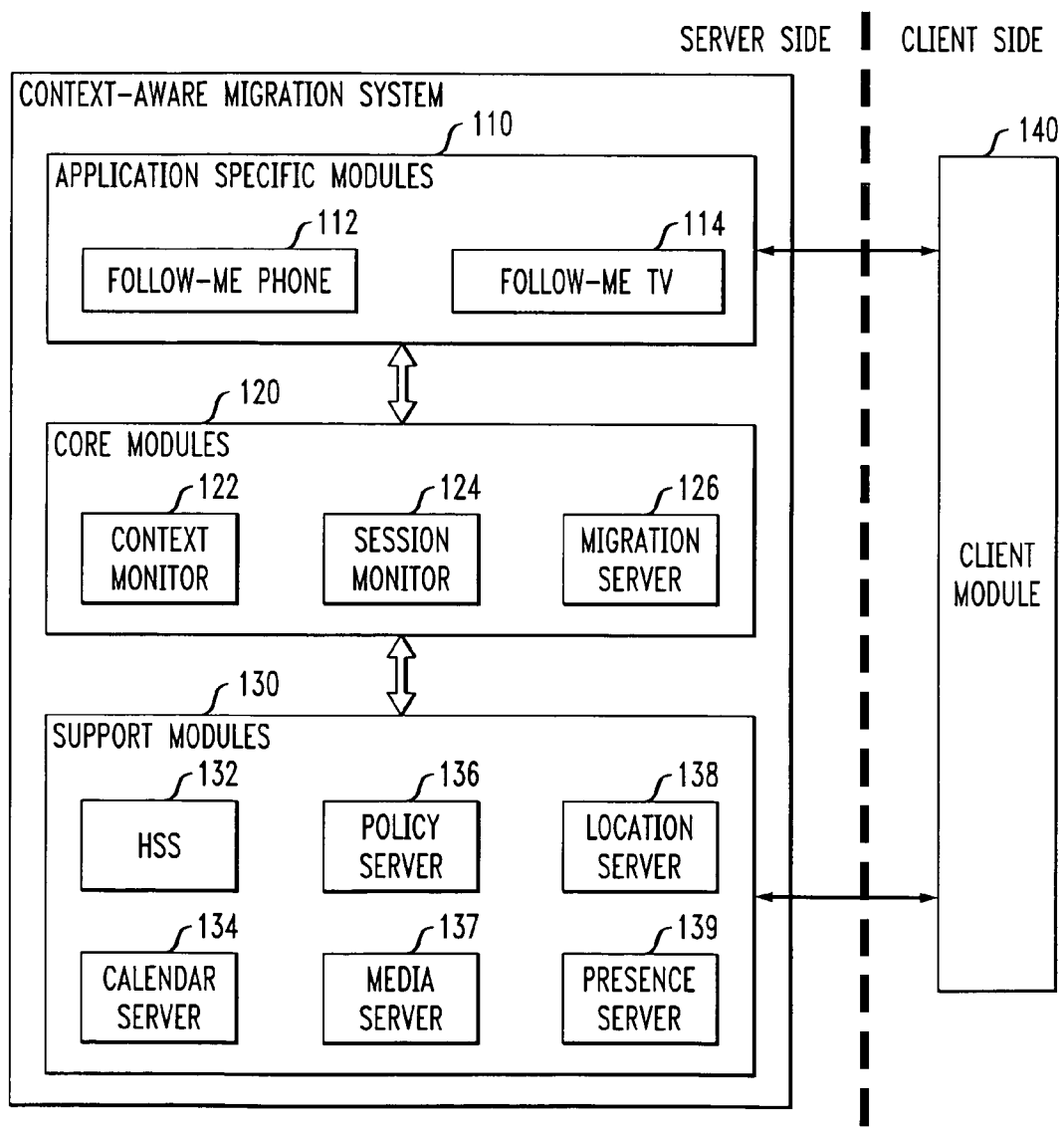
FIG. 1 illustrates a context-aware IMS-based migration system, according to an embodiment of the invention.

It is to be appreciated that while the present invention will be described below in the context of an IMS-based communication network, the invention is not so limited. That is, the present invention is more generally applicable to any data communication network in which it would be desirable to provide migration capability with regard to a network communication session.

As used herein, a "session" generally refers to a communication connection between two or more entities that persists for some time period during which data may be exchanged therebetween. A session is typically implemented and managed by a session layer in the corresponding network protocol. The overall "session" may include a network session which is the part of the overall session associated with the devices used to communicate, as well as a logical session which is the part of the overall session that is associated with the communicating parties (users) that persists regardless of the communication devices that the parties are using to communicate, as will be further explained below.

Further, the term "network," as used herein, generally refers to the IMS-based communication network, which is the combined communication network formed by the wireline networks and wireless networks that the IMS supports.

As will be illustratively described below, principles of the invention provide context-aware techniques for migrating, or transferring, a network session from one communication device to another communication device such that the session is able to persist.

Thus, illustrative principles of the invention introduce the concept of an extended context of a user in a communication network such as an IMS-based communication network. "Context," as will be more fully defined below, is not just the location and availability of a user but also the proximity of the user to different devices, ambient sensory information and calendar schedule. This context can be used to support a variety of context-aware applications as well as migration of sessions in an enhanced manner.

Thus, with the proliferation of different user devices (e.g., cell phones, personal digital assistants, laptops, etc.) with different capabilities for communications over different networks (e.g., 3G, Wi-Fi (802.11 standard), wireline broadband, etc.) and with different applications (e.g., email, instant messaging, voice phone, video phone, etc.) in the market coupled with the mobility of the user, it can be very difficult to determine the best way to reach the user. It necessitates the need to know the "context" of the user and how best to reach him/her so that no communication is lost. Broadly speaking, the context of the user is composed of multiple parts such as:

(i) geographic location: latitude, longitude and perhaps also altitude of the user;

(ii) proximity to other devices that the user can be reached at (this is both the personal devices he is carrying as well as other universal devices, such as a common television (TV), computer, telephone, etc., in the readily-accessible proximity of the user);

(iii) network and network quality (e.g., signal strength, congestion, etc.) at the location of the user;

(iv) current session (or none) the user is involved in and characteristics of the session such as type, encoding, state of the session (e.g., started, on hold, etc.);

(v) current activity of the user, e.g., in a board meeting, at lunch, etc., to determine availability and presence of the user (this "presence" of the user can either be explicit or implicit as obtained from calendar information); and/or (vi) other ambient conditions such as heat, humidity, etc., via multiple sensory detectors on the device or elsewhere and communicated to the network (this ambient condition information can also be used for home-land security type applications such as enabling effective evacuations, targeting involved population for dissemination of threat and security information, etc.).

When a user is involved in a communication session, such as a voice/video call, conference session or watching television (e.g., IP TV) on his personal device, there may arise a need to migrate the user to a different network (or different part of the network) and/or device. There are number of reasons that give rise to the need to migrate a user during a session such as:

(i) the signal strength of the network degrades to a level where it is not sufficient to support the bandwidth required by the current session;

(ii) the user moves into a different type of network (roaming between 3G and Wi-Fi);

(iii) the user wishes to move to a different device because of the availability of a better quality device; and/or (iv) social and other reasons such as moving a phone call from a personal cell-phone to a speaker phone at home or work, etc.

In order to be able to migrate a call for the above reasons in an easy and seamless manner, it is necessary to know the context of the user to enable an enhanced context-aware migration. An enhanced context-aware migration involves knowing the current context of the user and/or session and thus the proximity of the user to appropriate devices to which the user can be migrated. Some of these characteristics can best be known only by the network, while others are best known by the user. For example, the signal strength of a wireless network and congestion on a wireline network are best determined by the network elements themselves. However, the choice of the device where the user wishes to migrate is perhaps best under the control of the user, with the network only providing assistance in helping determine whether the new device will indeed support the current session in a better or worse manner.

Accordingly, illustrative principles of the invention provide a migration system that captures the enhanced context of a user (e.g., location, session, availability, proximity to devices, presence, etc.) and enables mobility of a current session from device to device, spanning wireless or wireline networks. The migration system operates at the service layer and once the appropriate device to which migration needs to happen is determined, leaves it to the underlying session and access layers to actually perform the migration.

The ability to migrate an ongoing session enables a wide variety of "follow-me" type services such as Follow-me-Phone, Follow-me-Chat, Follow-me-Video, and Follow-me-TV, etc. For illustrative purposes, below we define a scenario and the associated Follow-Me application and how the context-aware migration system plays a part in those applications.

Consider the scenario where someone has an important conference meeting to attend early in the morning. So while driving to work, the person dials into the conference bridge and gets logged on to the meeting. However, the voice quality on the phone is not the best possible and the person wants to switch to another device as he/she enters the office. As the person nears the parking lot or enters the office, the migration system detects that his/her location is now closer to a better desktop speaker phone, e.g., based on a location server and the person's device profile. The migration system alerts the person with the choices of devices (e.g., the desktop phone, a soft-phone on his/her computer, etc.) that he/she would want to possibly migrate to. If the conference call has an added component of a video, then possibly the best device available to migrate to (and thus upgrade the current session) is a soft-phone.

Upon selecting the appropriate device, the network automatically routes/migrates the person's call to the correct device seamlessly. Once the session is picked up from the new device, the original device session is terminated, thereby avoiding any interruptions and the need to redial into the conference. A better session is continued on the new phone. It is to be understood that the part of the session that is maintained is the logical session between the initial parties of original session. It is the network session between the original devices that is terminated.

Note that migration system is involved in both the selection of devices based on location and context of the session and also triggering a migration call to the lower session layer to move the session to a better device.

Given the above general description of the context-aware migration principles of the invention, an illustrative IMS-based system architecture and a call flow example are now described.

FIG. 1 is a block diagram of a context-aware IMS-based migration system, according to an embodiment of the invention. It is assumed that the context-aware IMS-based migration system is operatively coupled to the various wireline and wireless networks that the IMS supports.

As shown, migration system 100 is a multi-tiered distributed client-server architecture. On the server side, migration system 100 includes application specific modules 110, core modules 120, and support modules 130. By way of example, modules are operatively coupled to other modules as shown in this figure as well as shown in the subsequent figures. The application specific modules 110 include a variety of "follow-me" applications, e.g., Follow-me phone 112 (as described above) and Follow-me TV 114, to name a few. The core modules 120 include context monitor 122, session monitor 124, and migration server 126. The support modules 130 include home subscriber server (HSS) 132, calendar server 134, policy server 136, location server 138, media server 137 and presence server 139. On the client side, client module 140 is used in certain applications to enable some of the migration functionality.

One advantage of such architecture is that it opens up a wide variety of applications, each of which can define their own policies and rules for migration. The applications make use of the core and support modules to implement the intended behavior.

In general, core modules 120 provide the functionality of monitoring the session, the context and also handling the migration of the session. Application specific modules 110 perform application layer logic based on the policies specified by the application and use the core modules to make decisions of when and how the migration should take place. Support modules 130 provide the core support functionality such as location determination, policy/profile server, a calendar server that is integrated with the calendar of the individual and a media server. Some applications may need a client to enable the migration of sessions.

We now describe in detail each of the migration system modules.

Context monitor 122 is responsible for keeping track of the context of the user. As defined above, context is information including all/any of geographic location, proximity location, current time, presence of the user's devices. To do so, the context monitor communicates with HSS 132, location server 138, presence server 139 and other context-specific servers such as calendar server 134 and media server 137. The system may include other support modules (not shown).

Context monitor 122 assimilates the information and provides an interface to the application (e.g., Follow-me Phone application 112) to determine the context of the user. That is, the context monitor makes use of the information that is gathered from the support modules to present a coherent context picture to the application module. Advantageously, the application module need not be burdened with gathering context information since the separate context monitor performs this task. Thus, programming of the application is simplified and application processing is more efficient.

Session monitor 124 keeps track of the session characteristics. Session characteristics may, for example, include the state of the session, the type of the session, the users involved, any transcoders involved (i.e., for devices that support different encoding schemes, both for voice and video, a transcoder device may be employed between the devices), and the source of the session in case of streamed video broadcasts.

Migration server 126 handles the migration of a session. Upon receiving a cue from the application module, the migration server handles all the appropriate calls that need to be made to the underlying session layer to perform the actual migration of the session to the targeted device. That is, the migration server receives instruction from the application module (which makes a migration decision based on the predetermined policy) to effectuate the migration of the session. Advantageously, the application module need not be burdened with effectuating the actual migration since the separate migration server performs this task. Thus, again, programming of the application is simplified and application processing is more efficient.

Application modules 110 may be implemented as one or more servers which implement the application-specific logic for follow-me-like applications. Each application modules uses the core and support modules to support in the decision-making of the application logic.

Various support modules 130 are used in the migration system architecture. These modules provide specific functionality to enable migration capabilities.

HSS 132 stores the user profiles and preferences. These profiles and preferences can be set up by each user of the IMS-based network in which the context-aware migration system is implemented.

Calendar server 134 provides the calendar information of the users. The calendar information includes such information as meeting times and locations, busy times and free times.

Policy server 136 stores the policies for the users. A policy engine is necessary to mitigate policies between the users and the application. A policy is a rule that dictates whether a certain action should or must take place. For example, a call migration application may want to migrate a session to the nearest available phone with speaker abilities. However, the policy is set to always prompt the user when such a migration is to occur, and the user may have an over-riding decision option with regard to whether the migration should take place.

Location server 138 provides the location of devices. For cell-based networks, a Mobile Positioning Center (MPC) or a Gateway Mobile Location Center (GMLC) may serve this role. However, for other types of devices and networks, such as Wi-Fi or blue-tooth, special location servers are employed.

Media server 137 handles the transcoding of media between disparate devices, e.g., if a video session is to be transferred from a device supporting a higher bit rate to a device supporting a lower bit rate or a different encoding scheme.

Presence server 139 determines the presence information of the devices, e.g., whether a device is on/off, or whether the device is currently involved in a call (session).

Client module 140 assists with migration in certain applications. For some applications, a client module may need to reside on the user's device itself that can help with the migration, location determination and proximity monitoring. For example, the client module may perform global positioning system (GPS) functions, Bluetooth support, or radio frequency (RF) monitoring functions.

Given a description of the modules of the context-aware migration system, a call flow example will now illustrate migration principles of the invention.

Figure 2:
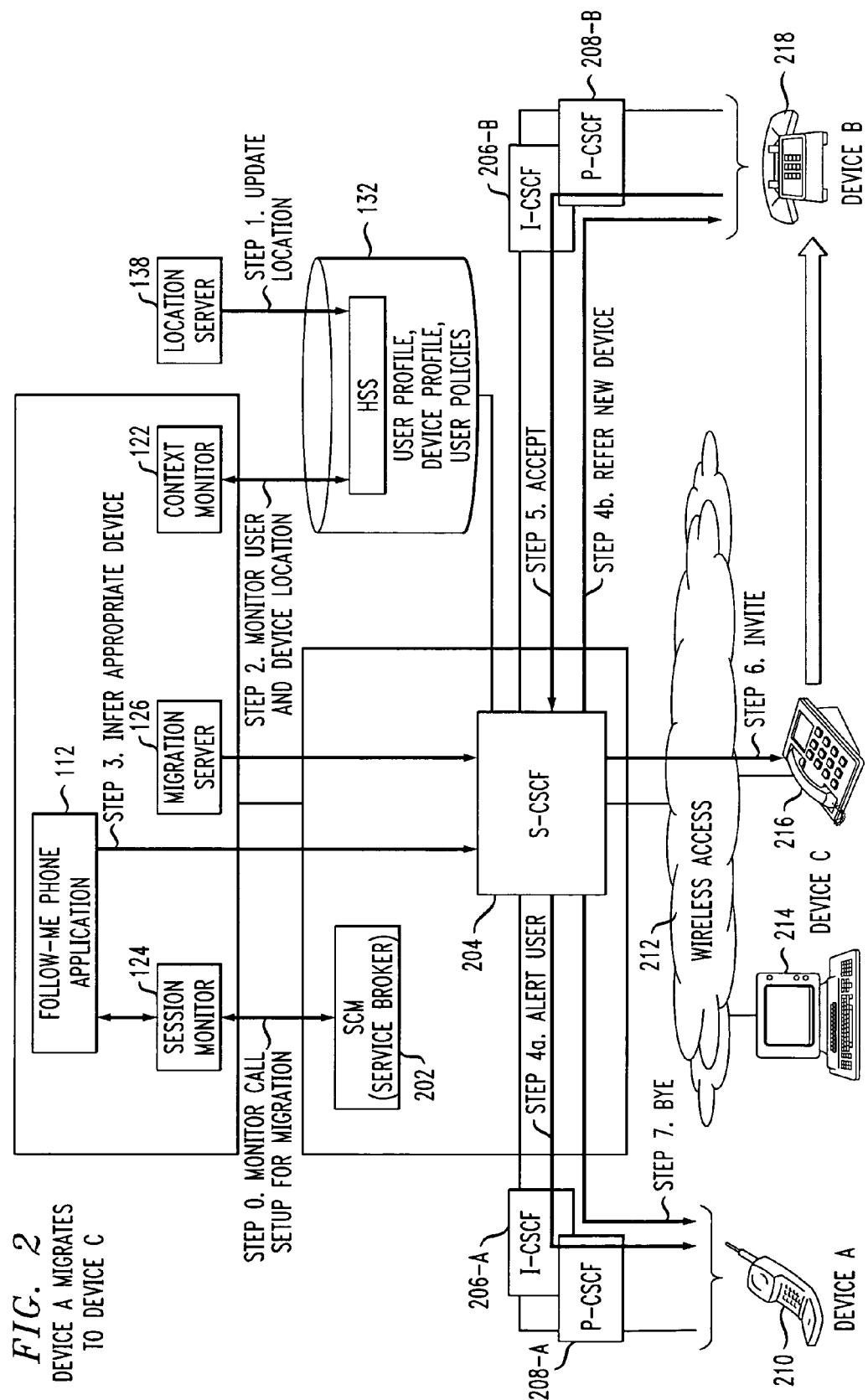
FIG. 2 illustrates a call migration example, according to an embodiment of the invention.

FIG. 2 illustrates a block diagram of a call migration example, while FIG. 3 illustrates a more detailed signaling protocol that is used to effectuate the call migration. It is to be appreciated that the example shown may not include the use of all support modules that the system may include. Further, the use of other support modules may be assumed (but not explicitly mentioned) in the example.

In the example of FIG. 2, certain components of the migration system of FIG. 1 are shown (with the same reference numerals). In addition, some IMS-based network components are shown, e.g., service broker 202 with serving call session control function (S-CSCF) 204, interrogating-CSCFs (I-CSCFs) 206-A and 206-B, and proxy-CSCFs (P-CSCFs) 208-A and 208-B. A P-CSCF is a communication device's point of contact in the network after registration. An I-CSCF is responsible for finding the S-CSCF at registration. An S-CSCF is responsible for identifying the user's service privileges, and for selecting access to an application server and for providing access to that server. It is to be understood that the overall network may include more or less components, and that the components in FIG. 2 are shown in order to describe the call migration example. The service broker and CSCFs perform there typical functions and are thereby used by the user devices and migration system to communicate.

Example devices shown in FIG. 2 include cell-phone 210, personal computer 214, video-phone 216, and standard telephone 218. It is to be understood that the type and quantity of user devices and networks shown in FIG. 2 are for illustrative purposes only, and that principles of the invention are not limited to any particular type or quantity of user devices or networks.

In this example, it is assumed that a user of device A is communicating with a user of device B. Then, it becomes necessary (or desired) that the user of device A migrate to device C so that the call can continue with the user of device B.

Initially (step 0), the system monitors the call setup for migration. This is done by session monitor 124 maintaining characteristics of the current session between device A and device B. It is assumed a situation has occurred that necessitates migration of the user (and, thus, the session) from device A to device C. Step 1 shows location server 138 updating HSS 132 with the current location of user devices. In step 2, context monitor 122 obtains updated user and device locations from HSS 132. From this information, in step 3, the migration system determines the appropriate device to which the call should be migrated (assumed to be device C). In step 4*a*, the user is alerted (on device A) of the pending migration to device C. In step 4*b*, the migration system refers (identifies) device C to device B. In step 5, device B accepts device C. In step 6, the migration system invites device C to participate in the call session. In step 7, device A is terminated from the call session. Then, the user (previously of device A) continues his call with the user of device B on device C.

Figure 3B:
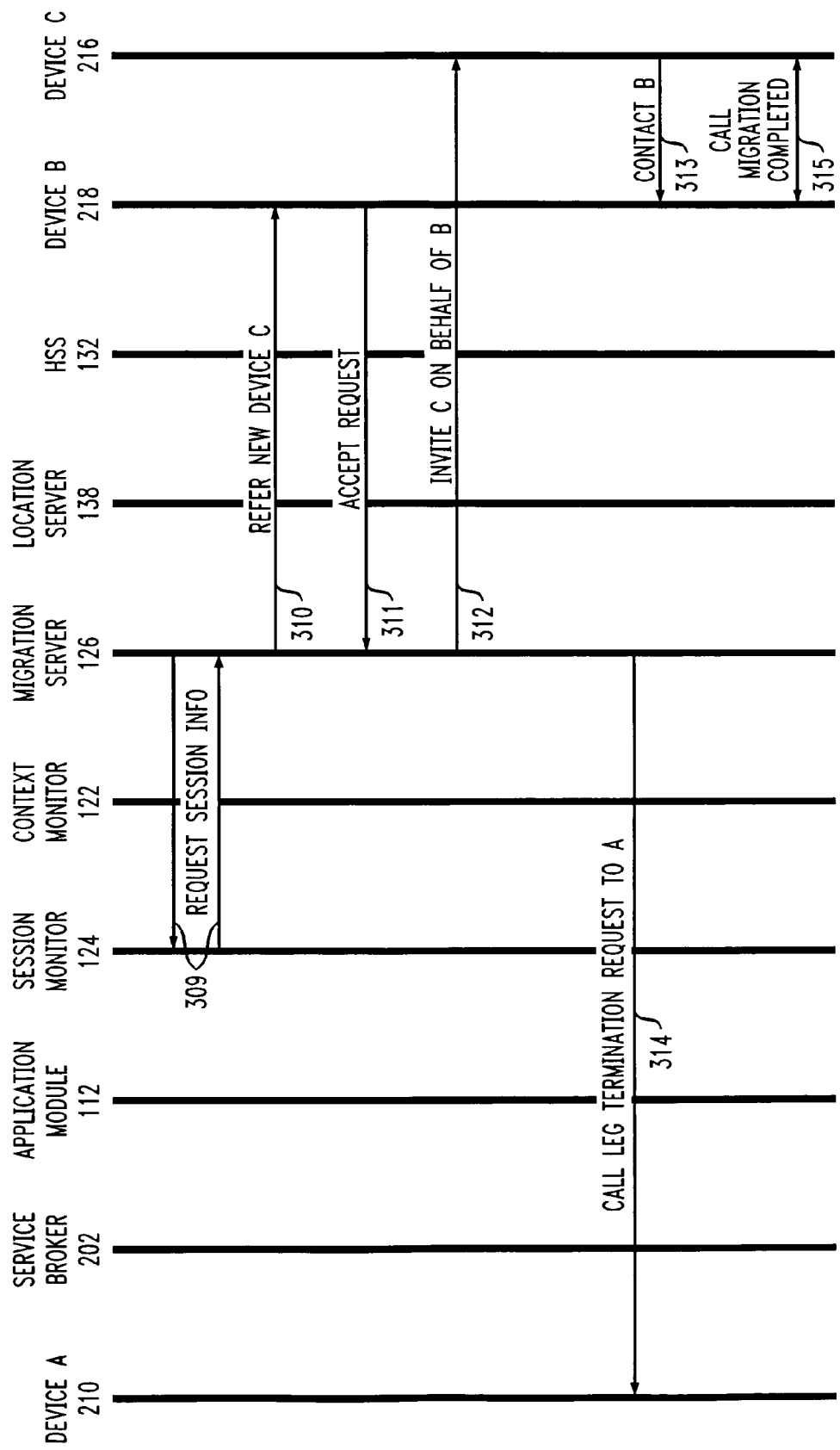
FIG. 3 illustrates a detailed signaling protocol that is used to effectuate the call migration of FIG. 2.

FIG. 3 illustrates a more detailed signaling protocol that is used to effectuate the call migration. It is to be noted that FIG. 3 includes FIGS. 3A and 3B, where FIG. 3B is a continuation of FIG. 3A such that the signaling in FIG. 3B sequentially follows the signaling in FIG. 3A. The components in FIG. 3 are the same as those shown in FIG. 2 (with the same reference numerals). For simplicity, the CSCFs are not shown. Also, where FIG. 2 assumed an existing call, FIG. 3 illustrates signaling used to initiate the call.

Accordingly, as shown, device A (210) initiates a call to device B (218) via service broker 202 (301), which is setup in a typical fashion. Service broker 202 notifies application module 112 of the request (302). Application module 112 notifies session monitor 124 of the call request (303). Application module 112 sends a request to context monitor 124 to monitor the context of the user of device A (304). Context monitor 122 requests profile/preference information about the user's devices from HSS 132 and, in response, the HSS provides the requested information to the context monitor (305). The context monitor also polls location server 138 for location information for the user's devices (306). Alternatively, as shown in FIG. 2, the location server can provide the location information to the HSS, which then sends the location information to the context monitor upon request.

As further shown, context monitor 122 notifies application module 112 when a context change occurs (307). The application module then applies a predetermined policy to determine if migration needs to occur. Assuming migration needs to occur based on the application logic applied, the application module requests migration of the call to device C (308). Migration server 126 requests and receives session information from session monitor 124 (309). The migration server refers new device C to device B (310). Device B accepts the request (311) from the migration server (311). The migration server invites device C on behalf of device B (312). Device C contacts device B (313). The migration server sends a call leg termination request to device A (314). Call migration is then completed (315).

Figure 4:
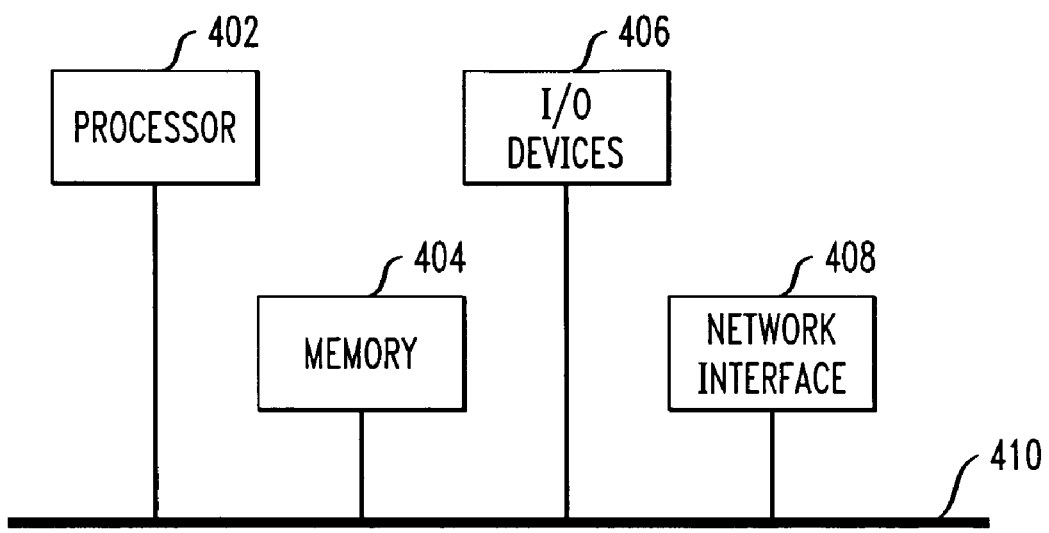
FIG. 4 illustrates a computer system suitable for implementing a context-aware migration system, according to an embodiment of the invention.

FIG. 4 illustrates an architecture of a computer system suitable for implementing a context-aware migration system, according to an embodiment of the invention. More particularly, it is to be appreciated that computer system 400 in FIG. 4 may be used to implement and perform the methodologies of the invention, as illustratively described above in the context of FIGS. 1 through FIG. 3. Thus, for example, one or more such computing systems may be employed to implement the modules shown in FIG. 1. Also, it is to be understood that one or more other network components may implement such a computing system. Of course, it is to be understood that the invention is not limited to any particular computing system implementation.

In this illustrative implementation, a processor 402 for implementing at least a portion of the methodologies of the invention is operatively coupled to a memory 404, input/ output (I/O) device(s) 406 and a network interface 408 via a bus 410, or an alternative connection arrangement.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism to provide inputs used by a system of the invention. Alternatively, the inputs could be read into the system from a diskette or from some other source (e.g., another computer system) connected to the computer bus 410. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing the computing system 400 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. Apparatus for migrating a communication session established between a first entity and a second entity in accordance with an application module operating at an application layer in a communication network, the apparatus comprising:
   a memory; and
   at least one processor coupled to the memory and operative to execute one or more software components that implement:
   a context monitor module supporting the application module and operative to obtain context information associated with at least one of the first entity and the second entity from one or more context-specific servers; and
   a migration server module operating at a session layer supporting the application module and operative to effectuate a transfer of the communication session from one communication device associated with the first entity to another communication device associated with the first entity without communication between the one communication device and the other communication device, wherein the transfer of the communication session results in a termination of the communication session on the one communication device and a continuation of the communication session on the other communication device, wherein the transfer does not require reestablishing the communication session between the first entity and the second entity;
   wherein the application module determines whether to perform the transfer from one communication device associated with the first entity to the other communication device associated with the first entity of the communication session between the first entity and the second entity based at least in part on the context information obtained by the context monitor module from the one or more context-specific servers;
   wherein the context monitor module and the migration server module operate in cooperation with the application module to transfer the communication session; and
   wherein the context monitor module, the migration server module, and the application module are implemented other than by the one communication device or the other communication device.

2. The apparatus of claim 1, wherein the application module receives at least a portion of the context information obtained by the context monitor module.

3. The apparatus of claim 1, wherein the application module causes the migration server module to effectuate the transfer when the application module determines that the transfer should occur such that the communication session continues between the first entity and the second entity after the transfer.

4. The apparatus of claim 1, further comprising one or more support modules supporting at least one of the context monitor module and the application module and operative to provide information thereto.

5. The apparatus of claim 1, wherein the communication session comprises an Internet Protocol Multimedia Subsystem session.

6. A method for migrating a communication session established between a first entity and a second entity in accordance with an application module operating at an application layer in a communication network, the method comprising the steps of:

obtaining, in a context monitor module executable in accordance with a processor for supporting the application module, context information associated with at least one of the first entity and the second entity from one or more context-specific servers; and effectuating, in a migration server module executable in accordance with the processor for operating at a session layer supporting the application module, a transfer of the communication session from one communication device associated with the first entity to another communication device associated with the first entity without communication between the one communication device and the other communication device, wherein the transfer of the communication session results in a termination of the communication session on the one communication device and a continuation of the communication session on the other communication device, wherein the transfer does not require reestablishing the communication session between the first entity and the second entity;

wherein the application module determines whether to perform the transfer from one communication device associated with the first entity to the other communication device associated with the first entity of the communication session between the first entity and the second entity based at least in part on the context information obtained by the context monitor module from the one or more context-specific servers;

wherein the context monitor module and the migration server module operate in cooperation with the application module to transfer the communication session; and wherein the context monitor module, the migration server module, and the application module are implemented other than by the one communication device or the other communication device.

7. The method of claim 6, wherein the application module receives at least a portion of the context information obtained by the context monitor module.

8. The method of claim 6, wherein the application module causes the migration server module to effectuate the transfer when the application module determines that the transfer should be performed such that the communication session continues between the first entity and the second entity after the transfer.

9. The method of claim 6, further comprising the step of obtaining, in a session monitor module supporting the application module, information associated with the communication session, wherein the application module receives at least a portion of the session information for use in making the transfer determination.

10. The method of claim 6, further comprising the step of obtaining, in one or more support modules, information useable by at least one of the context monitor module and the application module.

11. The method of claim 10, wherein the one or more support modules comprise a module for storing information pertaining to at least one of a profile and a preference of the first entity.

12. The method of claim 10, wherein the one or more support modules comprise a module for storing information pertaining to a schedule associated with the first entity.

13. The method of claim 10, wherein the one or more support modules comprise a module for storing information pertaining to a policy associated with the first entity.

14. The method of claim 10, wherein the one or more support modules comprise a module for storing information pertaining to a location of one or more communication devices associated with the first entity.

15. The method of claim 10, wherein the one or more support modules comprise a module for storing information pertaining to a status of one or more communication devices associated with the first entity.

16. Apparatus for migrating a communication session established between a first entity and a second entity in a communication network, the apparatus comprising:

a memory; and at least one processor coupled to the memory and operative to execute one or more software components that implement:

an application module operating at an application layer;

a context monitor module supporting the application module and operative to obtain context information associated with at least one of the first entity and the second entity from one or more context-specific servers;

a migration server module operating at a session layer supporting the application module and operative to effectuate a transfer of the communication session from one communication device associated with the first entity to another communication device associated with the first entity without communication between the one communication device and the other communication device, wherein the transfer of the communication session results in a termination of the communication session on the one communication device and a continuation of the communication session on the other communication device, wherein the transfer does not require reestablishing the communication session between the first entity and the second entity;

wherein the application module determines whether to perform the transfer from one communication device associated with the first entity to the other communication device associated with the first entity of the communication session between the first entity and the second entity based at least in part on the context information obtained by the context monitor module from the one or more context-specific servers;

wherein the context monitor module and the migration server module operate in cooperation with the application module to transfer the communication session; and wherein the context monitor module, the migration server module, and the application module are implemented other than by the one communication device or the other communication device.

17. The apparatus of claim 16, wherein the application module causes the migration server module to effectuate the transfer when the application module determines that the transfer should be performed such that the communication session continues between the first entity and the second entity after the transfer.

18. The apparatus of claim 16, wherein the communication session comprises an Internet Protocol Multimedia Subsystem session.

19. The method of claim 6, wherein the application module selects the other communication device of the first entity to which the communication session between the first entity and the second entity is transferred based at least in part on the context information obtained by the context monitor module from the one or more context-specific servers.

20. The method of claim 6, wherein the application module notifies a user associated with the first entity when the application module determines that the transfer should be performed.

21. The method of claim 20, wherein the application module causes the migration server module to effectuate the transfer when the application module receives a confirmation from the user responsive to the notification of the user.

\* \* \* \* \*